Patented May 5, 1931

1,803,615

UNITED STATES PATENT OFFICE

IVAN S. HOCKER, OF PHILADELPHIA, PENNSYLVANIA, ASSIGNOR TO THE HOCKER CORPORATION, OF PHILADELPHIA, PENNSYLVANIA, A CORPORATION OF DELAWARE

PROCESS OF EXTRACTING FAT FROM CACAO BEAN OR A PRODUCT THEREOF

No Drawing.  Application filed August 24, 1928. Serial No. 301,946.

My invention relates to a new and useful process of separating fat from vegetable matter, and in particular the process of extracting cocoa butter or fat from the cacao bean or any other cacao bean product, such as cocoa or the like.

My invention relates more particularly to a combined mechanical process, whereby the cocoa butter, or cocoa fat may be extracted from the cacao beans or a product thereof, with the greatest facility, with the least amount of time and labor consumed and with highest possible efficiency or yield of pure cocoa butter, and without the aid of any solvents or presses, heretofore employed for the purpose, and without the use of any harmful or odorous chemical reagents, which might adversely affect the resultant products.

With the above ends in view, my invention consists in reducing the cacao bean or product thereof to a suitable state of division, mixing this subdivided product with a suitable amount of water and heating the same to a temperature at which the starchy constituents of the cacao bean will be gelatinized by the action of the heat and water, and the soluble constituents thereof brought into solution, while such mixture is agitated by slow rotary motion about a substantially horizontal axis, thereby breaking the close association between the fatty constituents and the starchy constituents, by the complete wetting of the non-fatty constituents and thus liberating the former as free fat. In other words, the slow stirring under heat, by a horizontally disposed stirrer serves to introduce particles of water between the non-soluble solid particles of the fat globules surrounding and carried by said particles, thus separating said fat globules from said solid particles and permitting the light fatty substances to rise to the surface.

My invention further consists, in diluting the gelatinized aqueous mixture thus obtained, comprising the wetted non-fatty solids and liberated fat with water, to a suitable extent, reducing the temperature thereof, adding thereto a suitable amount of malt extract, (preferably a diastatic malt extract or a diastatic enzyme) and agitating the mixture by slow rotary motion about a vertical axis, for a suitable length of time, then adding to the mixture a suitable amount of an alkali carbonate, or an aqueous solution thereof, raising the temperature of the mixture and further agitating the same by a slow rotary motion, about a vertical axis until the liberated fatty constituents of the mixture separate out upon the upper surface of the mass.

For the purpose of illustrating my invention, I have described a preferred method of carrying out my process, which will give in practice, satisfactory and reliable results, although it is to be understood that such preferred method is susceptible of modification in various respects and that my invention is not limited to the precise method and process as herein set forth and described.

In carrying out my invention, I take a suitable amount of cacao bean or a product thereof, as for instance, a thousand pounds of the shelled and ground cacao bean meat commonly known as commercial chocolate liquor, place the same into a substantially horizontal cylindrical tank or cooker, having a suitable steam jacket along the lower portion thereof, and having mounted within it a suitable rotary stirrer carried by a substantially horizontal and axial shaft, add approximately a hundred gallons of water to the chocolate liquor, in order to obtain the proper consistency, and heat the mixture to a temperature of about 200 degrees F. and maintain the same at this temperature for a period of about one hour. During this period of about one hour, the mass is agitated by a slow rotary motion, about a horizontal axis, at approximately fourteen revolutions per minute, whereby the mass is thoroughly intermingled and the starchy constituents of the cacao are thereby thoroughly gelatinized by the action of the water and heat, and the soluble constituents are brought into solution. During this period also and by this step of the process, the non-fatty nonwater-soluble solid particles of the cacao, which normally form centers to and around which particles of fat collect and adhere to form fat globules are separated by the introduction of water between said fat particles and said center, solid, non-soluble particles whereupon the liberated fat particles will rise to the surface. The heat and the stirring tend to loosen the fat particles from the center non-soluble solid particles by weakening the force of adhesion thus enabling the water with which the mixture is treated to penetrate between the solid particles and the fat particles to separate the former from the latter.

I may add to the mass during this hour of heating and agitating, a slight amount of common salt, or sugar, or both; the former for the purpose of coagulating the proteins in the mixture, while the latter for the purpose of increasing the specific gravity of the mixture.

After approximately one hour of slow agitation at a temperature of about 200 degrees F. the mixture is transferred by gravity to the separator tank where it is diluted with an additional 140 to 240 gallons of water, both for the purpose of thinning the mixture and also for the purpose of reducing the temperature thereof, to approximately 150 degrees F. The separator tank, has mounted within it a substantially vertical rotary stirrer, also adapted to revolve at a very slow speed, at approximately eight revolutions per minute and to effect a stirring action about a substantially vertical axis. To the diluted and cooled mass or mixture in the separator tank there is then added approximately 25 pounds of diastatic malt extract and the mixture is then stirred slowly for about thirty minutes.

During this period of thirty minutes the action of the malt is to saccharify the starch which has heretofore been gelatinized, so as to transform the same to a soluble sugar, and thus further to liberate the starchy constituents into a free state, unattached to the fatty constituents. After a thorough saccharification of the gelatinized starchy constituents of the mass, a suitable amount of an alkali carbonate, as for instance three pounds of sodium carbonate is added to the mixture, preferably in the form of an aqueous solution, and the same is added preferably at the bottom of the mass through a suitable pipe extending from the upper surface to the bottom, and thereafter the mass is heated again to a temperature of approximately 200 degrees F. and slowly stirred by the rotary motion about a vertical axis, a sufficient length of time, to separate the liberated fatty constituents.

The action of the sodium carbonate is to liberate free carbon-dioxide gas, which then rises through the mass in a vertical direction, acting not only to break up any fatty emulsion which may have been formed, but also to carry with it the free or liberated fat. The slow rotary agitation about a vertical axis, augments and coacts with the carbon-dioxide gas, to raise to the surface the free fat.

The free fat thus separated on the upper surface of the mass, may then be drawn off by suitable means. The residue may be transferred into a centrifugal separator for the purpose of removing the slight amount of fat remaining therein, or for the purpose of separating the liquid and solid constituents of the residue to wit, producing a dry, fat free cocoa and an aqueous fat free cocoa extract respectively.

If desired, moreover, a further slight amount of fat may be obtained from the residue by chilling the same in a quiescent condition for a sufficient length of time.

I claim:

1. The herein described method of extracting fat from cacao beans, which consists in heating an aqueous mixture of a cacao bean product for a sufficient length of time for the starchy constituents thereof to gelatinize, agitating said mixture by a slow rotary motion about a horizontal axis, adding a suitable amount of diastatic material and agitating the mass by a slow rotary motion about a substantially vertical axis until the gelatinized starchy constituents thereof are saccharified, adding a suitable amount of a carbonate to the mixture, further agitating the same by a slow rotary motion about a substantially vertical axis until the fatty constituents are brought to the surface of the mass and lastly withdrawing said fatty constituents.

2. The herein described method of extracting fat from cacao bean or product thereof which consists in heating an aqueous mixture of finely divided cacao bean product and agitating such mixture by a rotary motion about a horizontal axis, until the starchy constituents of such mixture are gelatinized, diluting and cooling the mixture, adding a suitable amount of saccharifying reagent, slowly agitating the mixture by a rotary motion about a substantially vertical axis, until the gelatinized starchy constituents are thoroughly saccharified, adding to the mixture a suitable amount of carbonate, heating the mixture and further agitating the same until the fatty constituents are agglomerated and raised to the upper surface of the mass and lastly withdrawing said fatty constituents.

3. The herein described method of extracting fat from cacao beans which consists in heating and agitating an aqueous mixture of a cacao bean product by a rotary motion about a horizontal axis thereby thoroughly to wet the solid non-fatty constituents thereof so as to break down the intimate union between the same and the fatty constituents and so as also to gelatinize the starchy constituents, adding a suitable amount of diastatic material slowly agitating the mass until the gelatinized starchy constituents are saccharified adding a suitable amount of carbonate to the mixture and further agitating the same by a rotary motion about a vertical axis to raise the liberated fatty constituents to the surface, and lastly withdrawing said fatty constituents.

4. The hereindescribed method of extracting fat from cacao beans, which consists in heating an aqueous mixture of a cacao bean product for a sufficient length of time for the starchy constituents thereof to gelatinize, agitating said mixture by a slow rotary motion about a substantially horizontal axis, diluting said gelatinized mixture with water, adding a suitable amount of diastatic material and agitating the mass by a slow rotary motion upon a substantially vertical axis until the gelatinized starchy constituents thereof are saccharified, adding a suitable amount of carbonate to the mixture, heating the mixture after the addition of said carbonate, further agitating the mixture by a slow rotary motion about a substantially vertical axis, until the liberated fatty constituents are brought to the surface of the mass and lastly withdrawing said fatty constituents.

IVAN S. HOCKER.